(12) United States Patent
Rheaume et al.

(10) Patent No.: US 11,641,023 B2
(45) Date of Patent: May 2, 2023

(54) FUEL CELL SYSTEM AND METHOD

(71) Applicant: Hamilton Sundstrand Corporation, Charlotte, NC (US)

(72) Inventors: Jonathan Rheaume, West Hartford, CT (US); Matthew Pess, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 93 days.

(21) Appl. No.: 17/212,161

(22) Filed: Mar. 25, 2021

(65) Prior Publication Data

US 2021/0313607 A1 Oct. 7, 2021

Related U.S. Application Data

(60) Provisional application No. 63/006,255, filed on Apr. 7, 2020.

(51) Int. Cl.

| | |
|---|---|
| *H01M 8/06* | (2016.01) |
| *H01M 8/0606* | (2016.01) |
| *H01M 8/04007* | (2016.01) |
| *H01M 8/04223* | (2016.01) |
| *H01M 8/04701* | (2016.01) |
| *H01M 8/04858* | (2016.01) |

(52) U.S. Cl.
CPC ..... *H01M 8/0606* (2013.01); *H01M 8/04067* (2013.01); *H01M 8/04231* (2013.01); *H01M 8/04708* (2013.01); *H01M 8/04925* (2013.01); *H01M 2250/20* (2013.01)

(58) Field of Classification Search
CPC ........... H01M 8/0606; H01M 8/04067; H01M 8/04231; H01M 8/04708; H01M 8/04925

USPC .......................................................... 429/421
See application file for complete search history.

(56) References Cited

U.S. PATENT DOCUMENTS

| | | |
|---|---|---|
| 3,992,271 A | 11/1976 | Danzig et al. |
| 4,039,409 A | 8/1977 | Laconti et al. |

(Continued)

FOREIGN PATENT DOCUMENTS

| | | |
|---|---|---|
| JP | H04362006 A | 12/1992 |
| WO | 2012069348 A1 | 5/2012 |

OTHER PUBLICATIONS

European Search Report for Application No. 21166919.7, dated Jul. 28, 2021 43 pages.

(Continued)

*Primary Examiner* — James M Erwin
(74) *Attorney, Agent, or Firm* — Cantor Colburn LLP

(57) ABSTRACT

A system for generating electrical power includes an electrochemical cell including a cathode and an anode separated by an electrolyte, a cathode fluid flow path in operative fluid communication with the cathode including a cathode-side inlet and a cathode-side outlet, and an anode fluid flow path in operative fluid communication with the anode including an anode-side inlet and an anode-side outlet. The system also includes: a reactant source in operative fluid communication with the anode-side inlet; an oxygen generator in operative fluid communication with the cathode-side inlet, including a combustible composition comprising a fuel and a salt that thermally decomposes to release oxygen; and an electrical connection between the electrochemical cell and a power sink.

19 Claims, 4 Drawing Sheets

(56) References Cited

U.S. PATENT DOCUMENTS

| | | | |
|---|---|---|---|
| 4,528,083 | A | 7/1985 | Laconti et al. |
| 4,628,010 | A | 12/1986 | Iwanciow |
| 6,179,986 | B1 | 1/2001 | Swette et al. |
| 7,954,753 | B2 | 6/2011 | Hoffjann et al. |
| 8,313,868 | B2 | 11/2012 | Gruendel et al. |
| 8,347,645 | B1* | 1/2013 | Miller ............... H01M 8/04231 62/238.7 |
| 8,857,767 | B2 | 10/2014 | Stolte et al. |
| 8,925,865 | B2 | 1/2015 | Stolte et al. |
| 9,028,990 | B2 | 5/2015 | Gans et al. |
| 9,090,466 | B2 | 7/2015 | Presley et al. |
| 9,105,893 | B2 | 8/2015 | Delfino |
| 9,623,981 | B2 | 4/2017 | Darling et al. |
| 9,963,792 | B2 | 5/2018 | Rheaume |
| 10,207,925 | B2 | 2/2019 | Kallfass |
| 10,312,536 | B2 | 6/2019 | Rheaume |
| 2005/0066662 | A1 | 3/2005 | Cronce |
| 2005/0142403 | A1 | 6/2005 | Ulmer et al. |
| 2009/0061267 | A1 | 3/2009 | Monzyk et al. |
| 2010/0055517 | A1* | 3/2010 | Uzhinsky ............ H01M 8/0606 422/162 |
| 2012/0094196 | A1* | 4/2012 | Eickhoff ............ H01M 8/04089 429/414 |
| 2012/0240599 | A1 | 9/2012 | Stolte |
| 2013/0164642 | A1 | 6/2013 | Delfino |
| 2014/0004434 | A1 | 1/2014 | Saballus et al. |
| 2015/0188172 | A1* | 7/2015 | Yun ................... H01M 8/22 429/417 |
| 2015/0349356 | A1* | 12/2015 | Ribarov ............ H01M 8/04067 290/1 A |
| 2016/0006066 | A1* | 1/2016 | Robertson ............... C25B 15/08 429/417 |
| 2019/0388832 | A1 | 12/2019 | Rheaume |

OTHER PUBLICATIONS

JPH04362006(A)—Dec. 15, 1992, Abstract only, Retrieved at https://worldwide.espacenet.com/publicationDetails/biblio?DB=EPODOC&II=0&ND=3&adjacent=true&FT=D&date=19921215&CC=JP&NR=H04362006A&KC=A, Retrieved on Aug. 30, 2021, 1 page.

LaConti, A., and Swette, L. "Special applications using PEM-technology," Handbook of fuel cells (2010), 17 pages.

Wikipedia, "Chemical oxygen generator" [retrieved on Mar. 25, 2021 (Mar. 25, 2021)]. Retrieved from the internet:,URL: https://en.wikipedia.org/wiki/Chemical_oxygen_generator (3 pages).

* cited by examiner

FUEL CELL SYSTEM AND METHOD

CROSS REFERENCE TO RELATED APPLICATIONS

This application claims the benefit of an earlier filing date from U.S. Provisional Application Ser. No. 63/006,255 filed Apr. 7, 2020, the entire disclosure of which is incorporated herein by reference.

BACKGROUND

The subject matter disclosed herein generally relates to fuel cell systems for generating and providing electrical power, and to providing oxygen to a fuel cell, optionally also generating an inerting gas.

Fuel cells are known as a source of electrical power. Various types of fuel cells are known, and it is common for fuel cells to require a feed of a fuel that serves as a reducing agent and a feed of an oxidizing agent that can electrochemically react with the fuel. Ambient air can be used as a source of an oxidizing agent to a fuel cell; however, ambient air may not always be available at conditions (e.g., pressure and temperature) specified for fuel cell operation. Accordingly, there is a need for alternative arrangements to provide oxygen to fuel cells.

BRIEF DESCRIPTION

A system is disclosed for generating electrical power. The system includes an electrochemical cell including a cathode and an anode separated by an electrolyte. The system also includes: a cathode fluid flow path in operative fluid communication with the cathode including a cathode-side inlet and a cathode-side outlet, and an anode fluid flow path in operative fluid communication with the anode including an anode-side inlet and an anode-side outlet; a reactant source in operative fluid communication with the anode-side inlet; an oxygen generator in operative fluid communication with the cathode-side inlet, including a combustible composition comprising a fuel and a salt that thermally decomposes to release oxygen; and an electrical connection between the electrochemical cell and a power sink.

In one aspect, and in combination with any prior system, said salt comprises an alkali metal chlorate, an alkali metal perchlorate, an alkaline earth metal chlorate, or an alkaline earth metal perchlorate.

In one aspect, and in combination with any prior system, said fuel comprises a metal or non-metal reducing agent.

In one aspect, and in combination with any prior system, the fuel comprises aluminum, iron, magnesium, manganese, titanium, carbon, silicon, or boron.

In one aspect, and in combination with any prior system, the electrochemical cell is configured as a proton transfer fuel cell reactor including a proton transfer medium as said electrolyte.

In one aspect, and in combination with any prior system, the system further comprises a heater or heat exchanger arranged to heat or cool oxygen from the oxygen generator.

In one aspect, and in combination with any prior system, the electrochemical cell is configured as an oxygen ion transfer fuel cell reactor including an oxygen ion transfer medium as said electrolyte.

In one aspect, and in combination with any prior system, the system further includes a pressure regulator disposed on an oxygen flow path in fluid communication with the oxygen generator and the cathode.

In one aspect, and in combination with any prior system, the system further includes an inert gas flow path from the cathode-side outlet in operable fluid communication with a protected space.

In one aspect, and in combination with any prior system, the system further includes: an electrical connection in controllable communication between the electrochemical cell and a power source; and a controller configured to alternatively operate the system in alternate modes of operation selected from a plurality of modes including: a first mode in which electric power is directed from the power source to the electrochemical cell to provide a voltage difference between the anode and the cathode, and an inerting gas is directed from the cathode-side outlet to the protected space; and a second mode in which reactant from the reactant source is directed to the anode, electric power is directed from the electrochemical cell to the power sink, and the inerting gas is directed from the cathode-side outlet to the protected space.

Also disclosed is a method of generating electrical power. The method includes: reacting a composition comprising a fuel and a salt that thermally decomposes to release oxygen to produce released oxygen; directing the released oxygen to a cathode of an electrochemical cell including a cathode and an anode separated by an electrolyte; directing a reactant to the anode, and reacting the reactant with the released oxygen; and directing electrical power from the electrochemical cell to a power sink.

In one aspect, and in combination with any prior method said salt comprises an alkali metal chlorate, an alkali metal perchlorate, an alkaline earth metal chlorate, or an alkaline earth metal perchlorate.

In one aspect, and in combination with any prior method, said fuel comprises a metal or non-metal reducing agent.

In one aspect, and in combination with any prior method, the fuel comprises aluminum, iron, magnesium, manganese, titanium, carbon, silicon, or boron.

In one aspect, and in combination with any prior method, the electrochemical cell is configured as a proton transfer fuel cell reactor including a proton transfer medium as said electrolyte, and the method includes transferring protons from the anode across the proton transfer medium to the cathode, and reacting the protons with the released oxygen at the cathode.

In one aspect, and in combination with any prior method, the method further includes heating or cooling the released oxygen to form heated or cooled released oxygen, and directing the heated or cooled released oxygen to the cathode.

In one aspect, and in combination with any prior method, the electrochemical cell is configured as an oxygen ion transfer fuel cell reactor including an oxygen ion transfer medium as said electrolyte, and the method includes ionizing oxygen at the cathode, transferring the ionized oxygen across the oxygen ion transfer medium, and reacting the ionized oxygen with the reactant at the anode.

In one aspect, and in combination with any prior method, the method further includes regulating a pressure of the released oxygen.

In one aspect, and in combination with any prior method, the method further includes directing an inert gas from the cathode to a protected space.

In one aspect, and in combination with any prior method, the method further includes, alternatively operating the system in alternate modes of operation selected from a plurality of modes including: a first mode in which electric power is directed from a power source to the electrochemical cell to provide a voltage difference between the anode and the cathode, and an inerting gas is directed from the cathode to the protected space; and a second mode in which reactant from the reactant source is directed to the anode-side inlet, electric power is directed from the electrochemical cell to the power sink, and the inerting gas is directed from the cathode-side outlet to the protected space.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in stationary systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems or applications involving electrochemical systems may include the systems described herein. As such, the present disclosure is not limited to application to aircraft, but rather aircraft are illustrated and described as example and explanatory embodiments for implementation of embodiments of the present disclosure.

Figure 1A:
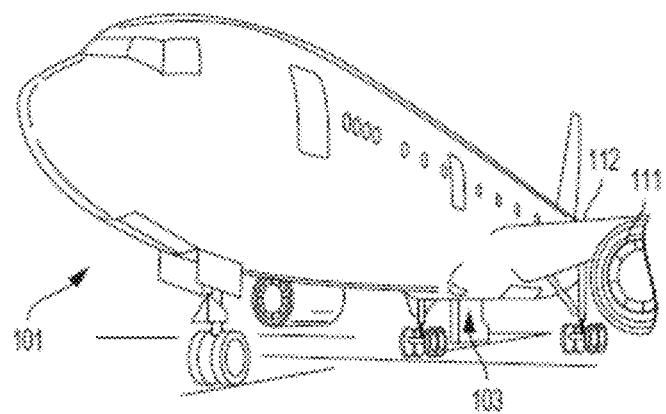
FIGS. 1A and 1B are schematic illustrations of different views of an aircraft.
Figure 1B:
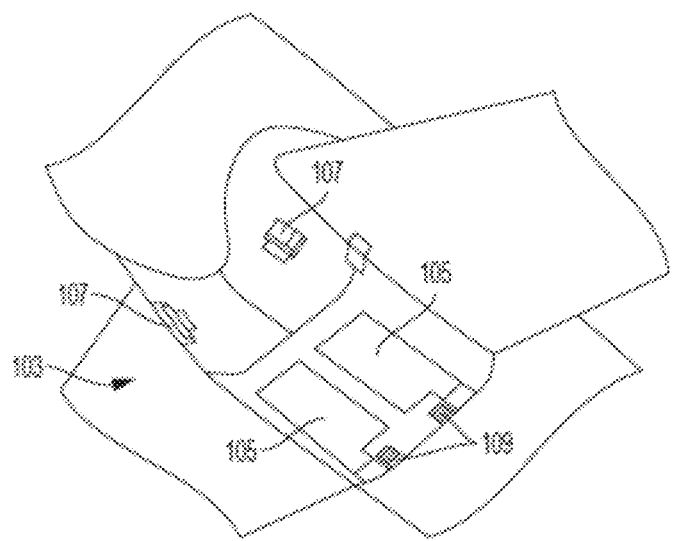

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inert gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., ECS heat exchangers) within the aircraft. Some air may be exhausted through one or more ram air exhaust outlets 109.

Also shown in FIG. TA, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
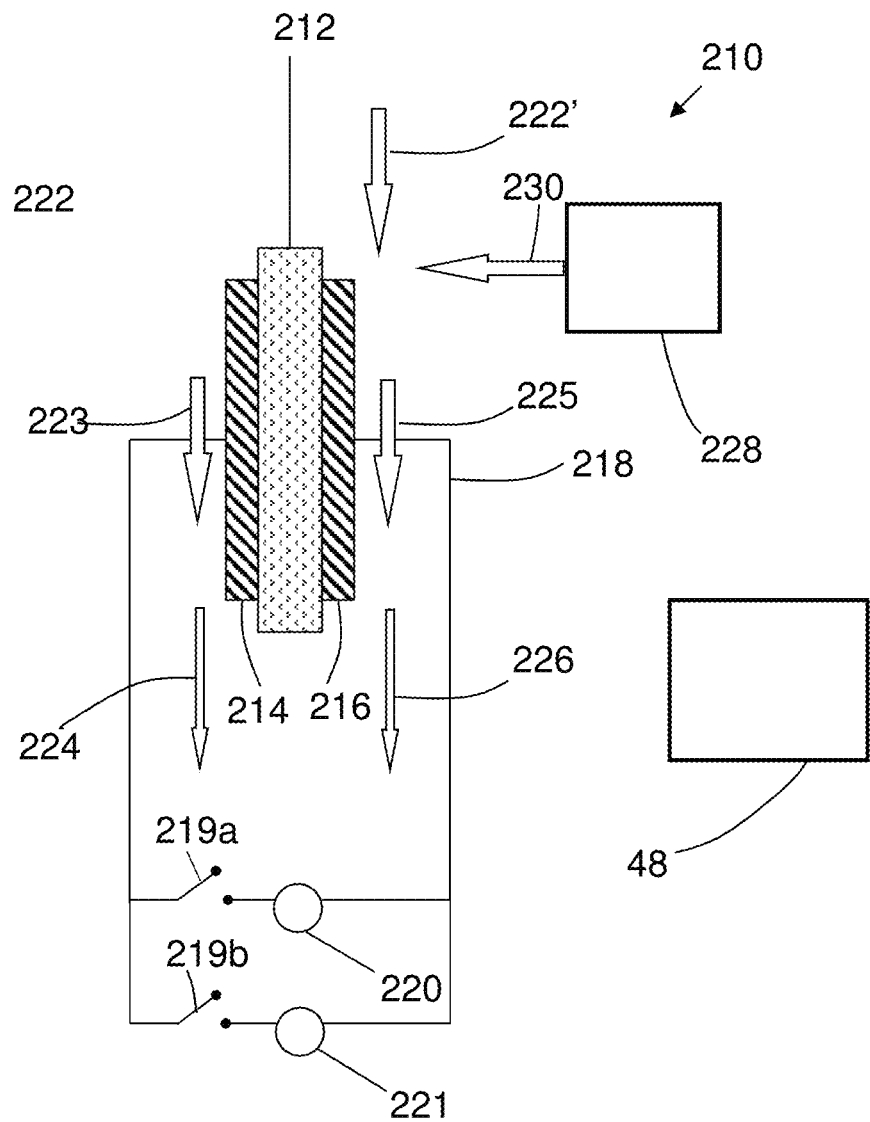
FIG. 2 is a schematic illustration of an electrochemical reactor that can be operated as a fuel cell.

Electrochemical cell reactors and their deployment and operation in power-generating that may also include generation of inert gas are described in further detail below. Referring now to FIG. 2, an electrochemical cell 210 is schematically depicted. The electrochemical cell 210 comprises a separator 212 that includes an ion transfer medium. As shown in FIG. 2, the separator 212 has a cathode 214 disposed on one side and an anode 216 disposed on the other side. Cathode 214 and anode 216 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Cathode 214 and anode 216 (which can include catalysts) are positioned adjacent to, and preferably in contact with the separator 212 and can be porous metal layers deposited (e.g., by vapor deposition) onto the separator 212, or can have structures comprising discrete catalytic particles adsorbed onto a porous substrate that is attached to the separator 212. Alternatively, the catalyst particles can be deposited on high surface area powder materials (e.g., graphite or porous carbons or metal-oxide particles) and then these supported catalysts may be deposited directly onto the separator 212 or onto a porous substrate that is attached to the separator 212. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 212. In either case, the cathode and anode layers 214 and 216 may also include a binder material, such as a polymer, especially one that also acts as an ionic conductor such as anion-conducting ionomers. In some embodiments, the cathode and anode layers 214 and 216 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

In some aspects, the electrochemical cell can be arranged and configured to operate exclusively as a fuel cell for providing electrical power and optionally inerting gas. In some aspects in which the fuel cell is operated to generate an inerting gas, the electrochemical cell can be arranged and configured to operate in alternative modes of operation as a fuel cell or in a power consumption mode. The cathode 214 and anode 216 can be controllably electrically connected by electrical circuit 218 to a controllable electric power system 220, which can include a power source (e.g., DC power rectified from AC power produced by a generator powered by a gas turbine engine used for propulsion or by an auxiliary power unit) and optionally a power sink 221. In some embodiments, the electric power system 220 can optionally include a connection to the electric power sink 221 (e.g., one or more electricity-consuming systems or components onboard the vehicle) with appropriate switching (e.g., switches 219a/219b), power conditioning, or power bus(es) for such on-board electricity-consuming systems or components, for optional operation in an alternative fuel cell mode.

With continued reference to FIG. 2, a cathode supply fluid flow path 222 directs gas from an air source (not shown) into contact with the cathode 214. Oxygen is electrochemically depleted from air along the cathode fluid flow path 223, and can be exhausted to the atmosphere or discharged as nitrogen-enriched air (NEA) (i.e., oxygen-depleted air, ODA) to an inert gas flow path 224 for delivery to an on-board fuel tank (not shown), or to a vehicle fire suppression system associated with an enclosed space (not shown), or controllably to either or both of a vehicle fuel tank or an on-board fire suppression system. An anode fluid flow path 225 is configured to controllably receive an anode supply fluid from an anode supply fluid flow path 222'. The anode fluid flow path 225 includes water when the electrochemical cell is operated in an electrolytic mode to produce protons at the anode for proton transfer across the separator 212 (e.g., a proton transfer medium such as a proton exchange membrane (PEM) electrolyte, proton-conducting solid oxide electrolyte, or phosphoric acid electrolyte). If the system is configured for alternative operation in a fuel cell mode, the anode fluid flow path 225 can be configured to controllably also receive fuel (e.g., hydrogen). The protons formed at the anode are transported across the separator 212 to the cathode 214, leaving oxygen on the anode fluid flow path, which is exhausted through an anode exhaust 226. The oxygen effluent may be entrained in process water in the form of bubbles or dissolved in the process water. Control of fluid flow along these flow paths can be provided through conduits and valves (not shown), which can be controlled by a controller 48 including a programmable or programmed microprocessor.

Exemplary materials from which the electrochemical proton transfer medium can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 212 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid electrolyzers and fuel cells.

During operation of a proton transfer electrochemical cell in the electrolytic mode, water is directed to the anode as a reactant source. The water at the anode undergoes an electrolysis reaction according to the formula:

$$H_2O \rightarrow \tfrac{1}{2}O_2 + 2H^+ + 2e^- \tag{1a}$$

Ozone can also be produced at the anode by a reaction according to the formula:

$$3H_2O \rightarrow O_3 + 6H^+ + 6e^- \tag{1b}$$

The electrons produced by these reactions are drawn from electrical circuit 218 powered by electric power source 220 connecting the positively charged anode 216 with the cathode 214. The hydrogen ion reactant (i.e., protons) produced by this reaction migrate across the separator 212, where they react at the cathode 214 with oxygen in the cathode flow path 223 to produce water according to the formula:

$$\tfrac{1}{2}O_2 + 2H^+ + 2e^- \rightarrow H_2O \tag{2}$$

Removal of oxygen from cathode flow path 223 produces nitrogen-enriched air exiting the region of the cathode 214. The oxygen evolved at the anode 216 by the reaction of formula (1) is discharged as anode exhaust 226.

During operation of a proton transfer electrochemical cell in a fuel cell mode, fuel (e.g., hydrogen) is directly supplied to the anode as a reactant either in pure form or as a hydrogen-rich reformate of a hydrocarbon fuel. The hydrogen at the anode undergoes an electrochemical oxidation according to the formula:

$$H_2 \rightarrow 2H^+ + 2e^- \tag{3}$$

The electrons produced by this reaction flow through electrical circuit 218 to provide electric power to the electric power sink 221. The hydrogen ions (i.e., protons) produced by this reaction migrate across the separator 212, where they react at the cathode 214 with oxygen in the cathode flow path 223 to produce water according to the formula (2):

$$\tfrac{1}{2}O_2 + 2H^+ + 2e^- \rightarrow H_2O \tag{2}$$

Removal of oxygen from cathode flow path 223 produces nitrogen-enriched air exiting the region of the cathode 214.

As mentioned above, the electrolysis reaction occurring at the positively charged anode 216 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice some amount of moisture will be removed through the cathode exhaust 224 and/or the anode exhaust 226 (either entrained or evaporated into the exiting gas streams). Accordingly, in some exemplary embodiments, water from a water source 228 is directed along a water flow path 230 past the anode 216 along an anode fluid flow path (and optionally also past the cathode 214). Such water, which can be recirculated in a flow loop, can also provide cooling for the electrochemical cells. In some exemplary embodiments, water can be provided at the anode from humidity in air along an anode fluid flow path in fluid communication with the anode. In other embodiments, the water produced at cathode 214 can be captured and recycled to anode 216 (e.g., through a water circulation loop, not shown). It should also be noted that, although aspects of this disclosure are contemplated where a single electrochemical cell is employed, in practice multiple electrochemical cells can be electrically connected in series with fluid flow along multiple cathode and anode flow paths routed through manifold assemblies.

In some embodiments, the electrochemical cell 210 can operate utilizing the transfer of oxygen anions across the separator 212. Exemplary materials from which the electrochemical oxygen anion-transporting electrolytes can be fabricated include solid oxides such as yttria-stabilized zirconia and/or ceria doped with rare earth metals. These types of materials are well known and have been used in solid oxide fuel cells (SOFC).

During operation of an oxygen anion transfer electrochemical cell in a power consuming (e.g., electrolyzer) mode, oxygen at the cathode undergoes an electrochemical reduction reaction according to the formula:

$$\tfrac{1}{2}O_2 + 2e^- \rightarrow O^- \tag{4}$$

The electrons consumed by this reaction are drawn from electrical circuit 218 powered by electric power source 220 connecting the positively charged anode 216 with the cathode 214. The oxygen anions produced by this reaction migrate across the separator 212, where they undergo an electrochemical oxidation reaction at the anode 214 according to the formula:

$$O^- \rightarrow \tfrac{1}{2}O_2 + 2e^- \quad (5)$$

Removal of oxygen from cathode flow path 224 produces nitrogen-enriched air exiting the region of the cathode 214. The oxygen produced at the anode 216 by the reaction of formula (5) is discharged as oxygen or an oxygen-enriched air stream as anode exhaust 26.

During operation of an oxygen ion transfer electrochemical cell in a fuel cell mode, oxygen at the cathode undergoes an electrochemical reduction reaction according to the formula (4), and the electrons consumed by this reaction are drawn from electrons liberated at the anode, which flow through electrical circuit 218 to provide electric power to electric power sink (not shown). The oxygen anions produced by this reaction migrate across the separator 212, where they react with fuel such as hydrogen (i.e., reactant) at the anode according to the formula:

$$\tfrac{1}{2}O_2 + 2e^- \rightarrow O^- \quad (4)$$

and $$H_2 + O^- \rightarrow H_2O + 2e^- \quad (6)$$

Carbon monoxide (e.g., contained in fuel reformate) can also serve as fuel in solid oxide electrochemical cells. In this case, the oxygen anions produced at the cathode according to formula (4) migrate across the separator 212 where they react with carbon monoxide at the anode according to the formula:

$$CO + O^- \rightarrow CO_2 + 2e^- \quad (7)$$

Removal of oxygen from cathode flow path 224 produces oxygen-depleted air exiting the region of the cathode 214. The steam and carbon dioxide produced at the anode 216 by the reactions of formulas (6) and (7) respectively is discharged along with unreacted fuel as anode exhaust 226. Any unreacted fuel that exits anode 216 via anode exhaust flow path 226 can be recycled to fuel flow path 432 using an ejector or blower (not shown), or can be fed to a fuel processing unit wherein the steam and carbon dioxide contribute to reforming.

Figure 3:
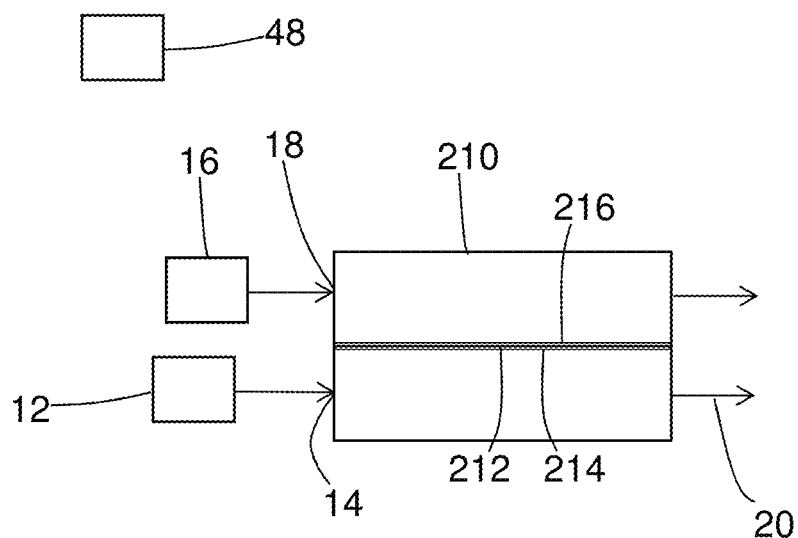
FIG. 3 is a schematic illustration of an example embodiment of a fuel cell system with an oxygen generator.

With reference now to FIG. 3, an example embodiment of a fuel cell system with a fuel cell 210 is schematically shown. Although one individual electrochemical cell is depicted, numerous cells can be configured in series as a stack as is common practice by those skilled in the art. As shown in FIG. 3, oxygen from an oxygen generator 12 including a combustible composition comprising a fuel and a salt that thermally decomposes to release oxygen is directed to an inlet 14 of the fuel cell 210 in operative fluid communication with the cathode 214. The oxygen generator 12 can be configured as a housing that includes an opening for exhaust of oxygen gas generated by the oxygen generator. An ignitor such can be included within the housing for initiation of a combustion reaction involving the fuel and the salt that thermally decomposes to release oxygen. Examples of ignitors include but are not limited to an electric resistance heater or a fuse (also referred to as a fuze) with explosive components designed to initiate a main charge. In the case of on-board aircraft emergency oxygen, explosives in the fuze (i.e., percussion cap) can include an explosive mixture comprising lead styphnate and tetrazene. In some embodiments, a filter or screen (not shown) may be disposed downstream of the oxygen generator in order to remove impurities from the oxygen flow.

With respect to the combustible oxygen-generating composition comprising a fuel and a thermally-decomposable salt, any fuel capable of undergoing an exothermic oxidation reaction can be used. In some aspects, the fuel can be in powder form or in the form of a monolith with gas flow channels therein in order to facilitate contact between the fuel and oxygen. Examples of fuels can include aluminum, iron, magnesium, manganese, titanium, carbon, silicon, or boron. In some aspects, the fuel can be such that the oxidized fuel reaction product is a solid (e.g., a metal oxide) so that relatively pure oxygen is generated by the oxygen generator. In some aspects, the fuel can be such that the oxidized fuel reaction product is a non-combustible gas (e.g., $CO_2$ from carbon fuel) so that a mixture of oxygen and a non-combustible gas is generated by the oxygen generator, which can promote formation of a non-combustible inerting gas on the cathode side of the fuel cell that can be directed along flow path 20 to a protected space (not shown) such as a fuel tank. Examples of salts that thermally decompose to release oxygen include alkali metal chlorates, alkali metal perchlorates, alkaline earth metal chlorates, or an alkaline earth metal perchlorate. Specific examples of salts that thermally decompose to release oxygen include sodium chlorate, sodium perchlorate, lithium chlorate, lithium perchlorate, potassium chlorate, potassium perchlorate, magnesium chlorate, magnesium perchlorate, calcium chlorate, or calcium perchlorate. A typical thermal decomposition reaction involving the release of oxygen is shown below in the formula:

$$2NaClO_3 \rightarrow 2NaCl + 3O_2 \quad (8)$$

The components of the oxygen-generating combustible composition can operate in a synergistic fashion, with a portion of the oxygen generated by thermal decomposition of the salt being used for the exothermic oxidation reaction of the fuel, which generates heat to thermally decompose the salt and release additional oxygen. The stoichiometry of the oxidation thermal decomposition reactions is such that more oxygen is released by thermal decomposition of the salt than is required for oxidation of the fuel, and the excess oxygen is directed to the fuel cell 210.

In some aspects, the oxygen generator 12 can include sufficient quantity of composition comprising fuel and thermally-decomposable salt to provide oxygen for a duration of operation of the fuel cell of at least a minute up to 4 hours (e.g., 240 minutes). Other ranges include from ten minutes to 10 hours. Of course, there ranges are exemplary and, as such, any time from 1 minute to 10 hours is hereby disclosed. Examples include sizing generator so that it can produce oxygen for to enable an aircraft emergency power unit to operate from as short as one minute (in the case of bird strikes to both engines during initial climb) up to several hours (e.g., 240 min or higher) for trans-oceanic crossings in which the engine generators are out.

With continued reference to FIG. 3, a reactant (i.e., a fuel cell fuel) that is electrochemically reactive with oxygen is directed from a reactant source 16 to an inlet 18 of the fuel cell 210, which is in operative fluid communication with the anode 216. Reaction between the reactant and the oxygen proceed as described above with respect to FIG. 2.

The systems described herein including the oxygen generator 12 can provide a technical effect of allowing for operation of a fuel cell under conditions where ambient air is not available at conditions for effective operation of the fuel cell. For example, on board an aircraft at higher altitudes (e.g., above 10,000 feet), outside air may be at a temperature or pressure that is not suitable for use as a source of oxygen to the fuel cell. Of course, outside ambient air can be compressed and/or heated, but use of a stand-alone compressor or heater would consume a substantial portion of the electrical power generated by the fuel cell. The oxygen generator can be configured so that the chemical reactions that generate oxygen take place under hermetically sealed conditions. The forward chemical reactions that take place at elevated temperature lead to an increase in pressure with the employ of a backpressure regulator situated downstream of the oxygen generator. Additionally, in cases where the fuel cell is used as a source of emergency power on board an aircraft, the aircraft may be in an operating condition (e.g., engine failure) where alternate sources of oxygen (e.g., engine compressor section bleed air) are not available. Accordingly, in some aspects, the fuel cell systems disclosed herein can be used as a source of emergency electrical power on board an aircraft.

Figure 4:
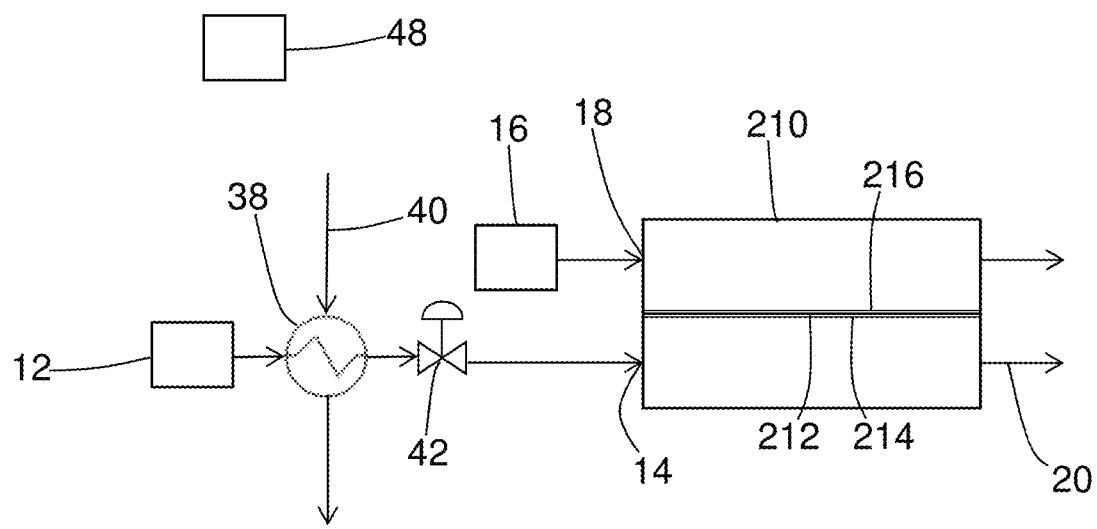
FIG. 4 is a schematic illustration of an example embodiment of a fuel cell system with an oxygen generator, a heat exchanger and a pressure regulator.
Figure 5:
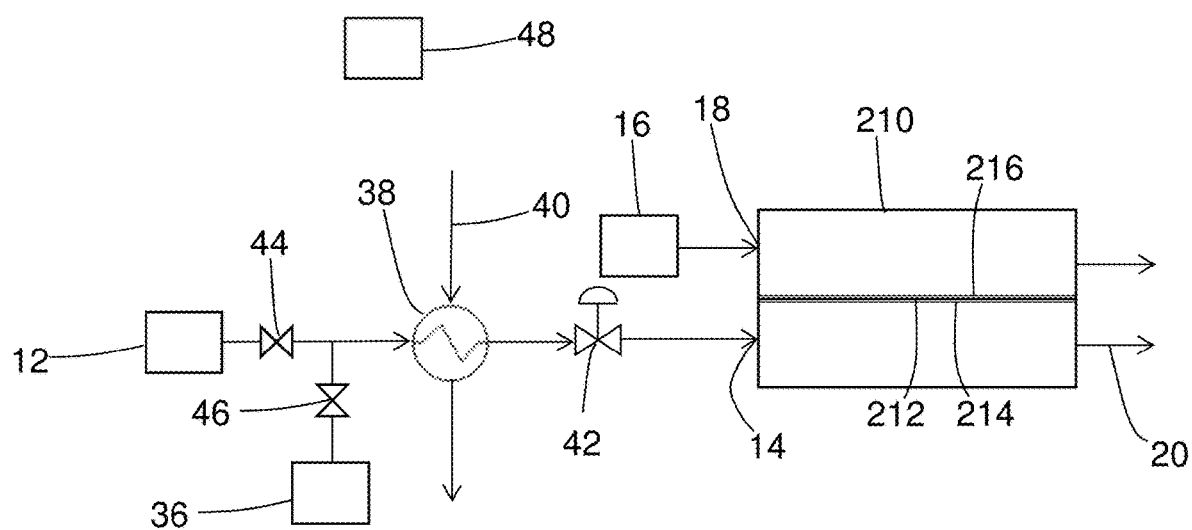
FIG. 5 is a schematic illustration of an example embodiment of a fuel cell system with alternate sources of oxygen including an oxygen generator a source of compressor bleed air.

FIGS. 4 and 5 schematically show systems with additional components or features compared to FIG. 3, and components or features common with FIG. 3 are identified with the same numbers as FIG. 3 without repeating the description thereof below. With reference to FIG. 4, an example embodiment of a fuel cell system similar to that of FIG. 3, with the inclusion of a heat exchanger 38 and a pressure regulator 42 disposed on the flow path between the oxygen generator 12 and the fuel cell 210. In some embodiments, the pressure regulator 42 can be disposed downstream of the fuel cell 210, such as on the flow path 20. Placement of the pressure regulator 42 downstream of the fuel cell 210 can provide a technical effect of promoting operation of the fuel cell 210 at an elevated pressure. The reactions in the oxygen generator 12 occur at relatively high temperatures (e.g., 250° C. or higher). Such temperatures may be acceptable or beneficial for a fuel cell configured as a solid oxide fuel cell, but may be too hot for a fuel cell configured as a PEM fuel cell. Accordingly, in some aspects, the heat exchanger 38 can reject heat from the exhaust gas from the oxygen generator 12 to a heat sink (e.g., aircraft ram air) along a heat transfer flow path 40. In the case of a fuel cell with a solid oxide electrolyte, additional heat from a heat source along the heat transfer flow path can be provided by the heat exchanger 38.

With reference now to FIG. 5, an example embodiment of a fuel cell system similar to that of FIG. 4, with the with inclusion of an alternate source of oxygen 36 for the fuel cell 210. In some aspects, the alternate source of oxygen can be compressor bleed air such as from a compressor section of a gas turbine engine. The fluid flow connections to the oxygen generator 12 and the alternate oxygen source 36 can be controlled by valves 44 and 46, or alternatively a three-way valve (not shown) can be used. A system controller 48 can be configured to operate the system in alternative modes in which oxygen is supplied from either the oxygen generator 12 or the alternate oxygen source 36. This can provide a technical effect of using a continuous source of oxygen such as compressor bleed air in response to a first condition (e.g., normal operation of an aircraft), while preserving the combustible composition in the oxygen generator 12 for conditions in which the alternate oxygen source 36 (e.g., compressor bleed air) is not available (e.g., multiple aircraft engine failures). In some aspects, the controller 48 can be configured to operate the fuel cell 210 in alternate modes of operation selected from a first mode that is a power consumption mode to produce inerting gas along flow path 20 for delivery to a protected space (e.g., a fuel tank, not shown) as described above with respect to FIG. 2, with air supplied by the alternate oxygen source 36, and a second mode in which the fuel cell 210 is operated in a power generation mode with oxygen supplied by the oxygen generator 12.

As further shown in the Figures, the systems disclosed herein can include a controller 48. The controller 48 can be in operative communication with the components shown in the Figures, as well as additional components (not shown) that may be utilized by the skilled person in implementing this disclosure, including but not limited to ejectors, reactors, reactant sources, and any associated valves, pumps, compressors, conduits, ejectors, pressure regulators, or other fluid flow components, and with switches, sensors, and other electrical system components, and any other system components to operate the electrochemical system. These control connections can be through wired electrical signal connections (not shown) or through wireless connections. In some embodiments, the controller 48 can be configured to operate the system according to specified parameters, as discussed in greater detail further above. The controller can be an independent controller dedicated to controlling the electrochemical system, or can interact with other onboard system controllers or with a master controller. In some embodiments, data provided by or to the controller 48 can come directly from a master controller.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for generating electrical power, comprising:
an electrochemical cell including a cathode and an anode separated by an electrolyte, a cathode fluid flow path in operative fluid communication with the cathode including a cathode-side inlet and a cathode-side outlet, and an anode fluid flow path in operative fluid communication with the anode including an anode-side inlet and an anode-side outlet;

a reactant source in operative fluid communication with the anode-side inlet;
an oxygen generator in operative fluid communication with the cathode-side inlet, including a combustible composition comprising a fuel and a salt that thermally decomposes to release oxygen; and
an electrical connection between the electrochemical cell and a power sink; and
a heater or heat exchanger disposed on a flow path between the oxygen generator and the electrochemical cell, the heater or heat exchanger arranged to heat or cool oxygen from the oxygen generator; and
a pressure regulator disposed on the flow path between the oxygen generator and the electrochemical cell, the pressure regulator in fluid communication with the oxygen generator and the cathode.

2. The system of claim 1, wherein said salt comprises an alkali metal chlorate, an alkali metal perchlorate, an alkaline earth metal chlorate, or an alkaline earth metal perchlorate.

3. The system of claim 1, wherein said fuel comprises a metal or non-metal reducing agent.

4. The system of claim 1, wherein the fuel comprises aluminum, iron, magnesium, manganese, titanium, carbon, silicon, or boron.

5. The system of claim 1, wherein the electrochemical cell is configured as a proton transfer fuel cell reactor including a proton transfer medium as said electrolyte.

6. The system of claim 1, wherein the electrochemical cell is configured as an oxygen ion transfer fuel cell reactor including an oxygen ion transfer medium as said electrolyte.

7. The system of claim 1, further comprising an alternate source of oxygen for the electrochemical cell, the alternate source of oxygen comprising compressor bleed air.

8. The system of claim 1, further comprising an inert gas flow path from the cathode-side outlet in operable fluid communication with a protected space.

9. The system of claim 8, further comprising:
an electrical connection between the electrochemical cell and a power source; and
a controller configured to alternatively operate the system in alternate modes of operation selected from a plurality of modes including:
a first mode in which electric power is directed from the power source to the electrochemical cell to provide a voltage difference between the anode and the cathode, and an inerting gas is directed from the cathode-side outlet to the protected space; and
a second mode in which reactant from the reactant source is directed to the anode, electric power is directed from the electrochemical cell to the power sink, and the inerting gas is directed from the cathode-side outlet to the protected space.

10. A method of generating electrical power, comprising:
reacting a composition comprising a fuel and a salt that thermally decomposes to release oxygen to produce released oxygen, and a heater or heat exchanger and a pressure regulator disposed on a flow path between the released oxygen and a cathode of an electrochemical cell, the heater or heat exchanger arranged to heat or cool the released oxygen, and the pressure regulator in fluid communication with the cathode;
directing the released oxygen to the cathode of the electrochemical cell including the cathode and an anode separated by an electrolyte;
directing a reactant to the anode, and reacting the reactant with the released oxygen; and
directing electrical power from the electrochemical cell to a power sink.

11. The method of claim 10, wherein said salt comprises an alkali metal chlorate, an alkali metal perchlorate, an alkaline earth metal chlorate, or an alkaline earth metal perchlorate.

12. The method of claim 10, wherein said fuel comprises a metal or non-metal reducing agent.

13. The method of claim 10, wherein the fuel comprises aluminum, iron, magnesium, manganese, titanium, carbon, silicon, or boron.

14. The method of claim 10, wherein the electrochemical cell is configured as a proton transfer fuel cell reactor including a proton transfer medium as said electrolyte, and the method includes transferring protons from the anode across the proton transfer medium to the cathode, and reacting the protons with the released oxygen at the cathode.

15. The method of claim 14, further comprising heating or cooling the released oxygen to form heated or cooled released oxygen, and directing the heated or cooled released oxygen to the cathode.

16. The method of claim 10, wherein the electrochemical cell is configured as an oxygen ion transfer fuel cell reactor including an oxygen ion transfer medium as said electrolyte, and the method includes ionizing oxygen at the cathode, transferring the ionized oxygen across the oxygen ion transfer medium, and reacting the ionized oxygen with the reactant at the anode.

17. The method of claim 10, further comprising regulating a pressure of the released oxygen via the pressure regulator.

18. The method of claim 10, further comprising directing an inert gas from the cathode to a protected space.

19. The method of claim 18, further comprising:
alternatively operating the system in alternate modes of operation selected from a plurality of modes including:
a first mode in which electric power is directed from a power source to the electrochemical cell to provide a voltage difference between the anode and the cathode, and an inerting gas is directed from the cathode to the protected space; and
a second mode in which reactant from the reactant source is directed to the anode-side inlet, electric power is directed from the electrochemical cell to the power sink, and the inerting gas is directed from the cathode-side outlet to the protected space.

* * * * *